United States Patent [19]
Sharma et al.

[11] Patent Number: 5,980,701
[45] Date of Patent: Nov. 9, 1999

[54] CORONA METHOD AND APPARATUS FOR ALTERING CARBON CONTAINING COMPOUNDS

[75] Inventors: Amit K. Sharma; Donald M. Camaioni; Gary B. Josephson, all of Richland, Wash.

[73] Assignee: Battelle Memorial Institute, Richland, Wash.

[21] Appl. No.: 08/926,340

[22] Filed: Sep. 5, 1997

Related U.S. Application Data

[63] Continuation-in-part of application No. 08/709,892, Sep. 9, 1996, abandoned.

[51] Int. Cl.$^6$ .................................................. B01J 19/08
[52] U.S. Cl. ......................... 204/165; 204/168; 588/210; 588/212
[58] Field of Search ................................. 205/165, 168; 588/210, 212, 227

[56] References Cited

U.S. PATENT DOCUMENTS 3,281,346  10/1966  Brown et al. ........................... 204/165

FOREIGN PATENT DOCUMENTS

| | | |
|---|---|---|
| 0468478 A2 | 1/1992 | European Pat. Off. . |
| 4341496 A1 | 6/1985 | Germany . |
| 4440813 A1 | 11/1994 | Germany . |
| 916757 | 1/1963 | United Kingdom . |
| WO 95/18768 | 7/1995 | WIPO . |

OTHER PUBLICATIONS

J. Hoigné et al., "Rate Constants of Reactors of Ozone With Organic and Inorganic Compounds in Water–II" vol. 17, pp. 185 to 194, 1983. (No month available)
S.C. Goheen, et al., "The Degradation of Organic Dyes by Corona Discharge," Feb. 1992.
A. Hickling, "Electrochemical Processes in Glow Discharge at the Gas–Solution Interface," The Mechanism of Charge Transfer, pp. 328–373. (no month available).
R.B. Craig, "Hazardous Waste Remedial Actions Program, Annual Progress Report," Aug. 1990, pp. 121–132.
R.A. Davis and A. Hickling., "Glow–discharge Electrolysis. Part I. The Anodic Formation of Hydrogen Peroxide in Inert Electrolytes," 1952, pp. 3595–3602. No month available.
A. Hickling and J.K. Linacre, "Glow–discharge Electrolysis. Part II. The Anodic Oxidation of Ferrous Sulphate," 1954, pp. 711–720. no month available.
William L. Hudson, "Treatment of Liquids with Electric Dicharges," The American Institute of Chemical Engineers, 1979, pp. 80–92. no month available.
CA 1977: 129,981. no month available.
CA 1995: 369,931. no month available.
CA 1996: 44,952. no month available.
CA 1997: 287,488. no month available.

*Primary Examiner*—Kishor Mayekar
*Attorney, Agent, or Firm*—Paul W. Zimmerman

[57] ABSTRACT

The present invention is a method and apparatus for altering a carbon containing compound in an aqueous mixture. According to a first aspect of the present invention, it has been discovered that for an aqueous mixture having a carbon containing compound with an ozone reaction rate less than the ozone reaction rate of pentachlorophenol, use of corona discharge in a low or non-oxidizing atmosphere increases the rate of destruction of the carbon containing compound compared to corona discharge an oxidizing atmosphere. For an aqueous mixture containing pentachlorphenol, there was essentially no difference in destruction between atmospheres. According to a second aspect of the present invention, it has been further discovered that an aqueous mixture having a carbon containing compound in the presence of a catalyst and oxygen resulted in an increased destruction rate of the carbon containing compound compared to no catalyst.

9 Claims, 11 Drawing Sheets

CORONA METHOD AND APPARATUS FOR ALTERING CARBON CONTAINING COMPOUNDS

This application is a continuation-in-part of application Ser. No. 08/709,892 filed Sep. 9, 1996, now abandoned.

This invention was made with Government support under Contract DE-AC06 76RLO 1830 awarded by the U.S. Department of Energy. The Government has certain rights in the invention.

FIELD OF THE INVENTION

The present invention relates generally to a method and apparatus for altering carbon containing compounds with corona discharge. More specifically, hazardous waste compounds are altered or converted or destroyed to less hazardous compounds or elements with the corona discharge.

BACKGROUND OF THE INVENTION

Disposal, clean-up and/or site remediation of hazardous carbon containing compounds continues to be a challenge, especially for organic compounds that are difficult to oxidise or are "non-oxidizable". J. Hoigne and H. Bader, OZONATION OF WATER: SELECTIVITY AND RATE OF OXIDATION OF SOLUTES, Ozone: Science and Engineering, Vol. 1, pp 73–85, 1979 identify the following compounds as "not [be] oxidized directly by ozone even during an extended ozonation": chloroethylenes including specifically tetrachloroethylene, and trichloroethylene, benzene, aliphatic alcohols, aldehydes, carbonic acids, specifically oxalic acid. Other non-oxidizable compounds include but are not limited to carbon tetrachloride ($CCl_4$), methylisobutylketone (MIBK) also known as hexone, 4-methyl-2-pentanone, perchloroethylene (PCE), and pentachlorophenol (PCP).

Research in this field has been ongoing for many years. In the paper TREATMENT OF LIQUIDS WITH ELECTRIC DISCHARGES, W. L. Hudson, The American Institute of Chemical Engineers, 1979, various embodiments of "plasma reactors" are shown and discussed. The reactors tend to have the common features of one electrode positioned above or away from the liquid containing the carbon containing compound to be treated and a second electrode in contact with the liquid containing the carbon containing compound to be treated. However, Hudson states The only encouraging success with the treatment of liquids with electric discharges has been in a partial vacuum at or near the vapor pressure of the liquid being treated, more specifically in the pressure range 20 to 70 mm of Hg. If the pressure is less than the vapor pressure of the liquid being treated, the liquid boils, sometime violently. If the pressure increases as a result of gas buildup in the system the discharge might extinguish itself and at best becomes much less efficient.

Hudson does, however, report a test using pulsed discharge at 1 atmosphere pressure. Hudson reports percent reacted of a carbon containing compound as ranging from 7 percent reacted to 92 percent reacted. Compounds reacted were $Fe^{++}$, and carbon containing compounds reacted of phenol, sewage, and acrylonitrile.

In an article of the Journal of Chemical Society, GLOW DISCHARGE ELECTROLYSIS. PART I. THE ANODIC FORMATION OF HYDROGEN PEROXIDE IN INERT ELECTROLYSIS, R. A. Davies, A. Hickling, pp 3595–3602, 1952, the authors studied the formation of hydrogen peroxide using glow discharge. They observed the influence of varying electrical current, volume of anolyte, surface area, electrode distance, size and shape of electrode, type of gas atmosphere (air, $N_2$, $O_2$, $H_2$, $N_2O$), pressure and type of electrolyte. For type of gas atmosphere, they found no difference in the amount of peroxide production. In a second article in the Journal of Chemical Society, GLOW DISCHARGE ELECTROLYSIS. PART II. THE ANODIC OXIDATION OF FERROUS SULFATE, A. Hickling, J. K. Linacre, pp 711–720, 1954, ferrous sulfate oxidation was studied by varying the same parameters as had been done for hydrogen peroxide formation. Again, it was found that varying the atmosphere from $N_2$ to $H_2$ had no appreciable effect. A minor effect was observed for $O_2$ atmosphere.

In a report, HAZARDOUS WASTE REMEDIAL ACTIONS PROGRAM ANNUAL PROGRESS REPORT, R. B. Craig, DOE/HWP-102, Martin Marietta Energy Systems, Inc., August 1990, pp 121–125, there is described tests in which air ions, specifically $O_2^-$, are used to destroy acrylamide, chlorobenzene, styrene, phenol, benzene, methoxychlor, 2,4-dichlorophenol, chloroform, benzoic acid, and citric acid.

In a paper, THE DEGRADATION OF ORGANIC DYES BY CORONA DISCHARGE, S. C. Goheen et al., Chemical Oxidation: Technology for the 90's Conference February 1992, a corona discharge reaction vessel is shown with one electrode suspended above a liquid surface and a second electrode in contact with the liquid. Electricity was applied from 5–15 kV, 10 to 50 $\mu A$ to degrade organic dyes, specifically Malachite Green, New Coccine, methylene blue, and silicic acid. Air and nitrogen were used and found to influence the amount of electrical current needed, but with no effect on chemical reaction rate, except that oxygen was necessary. There was no reaction with only nitrogen and reaction rate increased with increasing oxygen concentration, thereby concluding that "oxygen is clearly required for the dye to react with species generated by corona discharge".

Corona discharges are relatively low-power electrical discharges that can be initiated at or near ambient conditions. The corona is in the gas phase and, when generated with an electrode above a liquid surface and an electrode in contact with the liquid, the corona is also immediately on the liquid surface. It should be noted that corona discharge is not merely another configuration of electrolysis where chemical reactions are accomplished by charge transfer oxidation and reduction. Hickling et al. (cited above) proved that charge transfer is only a minor factor in corona discharge and that the chemical effects are fundamentally different. Most noticeably, many equivalents of chemical reaction can be accomplished for each electron of charge transfer. Each electron accelerating through the electric field collides with many gas molecules creating other charged particles and neutral active species (free radicals and atoms). Depending on the conditions of the discharge active species accounting for between 8 and 180 reactions have been measured for each electron of charge transferred. These can bring about ionization, excitation or dissociation of solvent molecules by collision, in addition to charge transfer reactions observed in a typical electrochemical process.

Corona discharge is most similar to radiolysis or electron beam processes and the concepts and ideas developed in radiation chemistry can be directly applied to this type of corona discharge process as pointed out in by Hickling in his book THE MECHANISM OF CHARGE TRANSFER, Chapter 5, "Electrochemical Processes in Glow Discharge at the Gas-Solution Interface", pp. 328–373. However, there are some noteworthy differences between the two processes.

For example, although the energy per electron in corona discharge is relatively low (~100 eV) as compared to most ionizing radiation (~$10^4$–$10^7$ eV), the dose rate can be extremely high. It was measured by Hickling et al., that for a current of 0.075 A, the number of singly charged gaseous ions reaching the solution surface per minute was $2.8 \times 10^{19}$. Assuming an average energy of 100 eV, the dose rate for corona discharge amounts to $2.8 \times 10^{21}$ eV min$^{-1}$. This is significantly higher than the dose rate normally used in radiolysis (~$10^{16}$–$10^{20}$ eV cc$^{-1}$ min$^{-1}$). Therefore, the amount of chemical change which can be affected in corona discharge is much greater than that in radiolysis, and high concentrations of substrate can be used. Furthermore, under these conditions, impurities seem to have much less effect (Hickling, ELECTROCHEMICAL PROCESSES IN GLOW DISCHARGE AT THE GAS SOLUTION INTERFACE, pp 329–373, J. of Electroanalytical Chemistry, 1964). Thus, corona discharge is distinct from typical electrochemical processes because it can bring about chemical changes which are similar to those which result from ionizing radiation. Corona discharge is also distinct from radiolysis because the energy input is of the order of an electrochemical process.

The research described above has not resulted in a corona discharge method and apparatus that is capable of cost effectively removing hazardous carbon containing compounds from water, or destroying the hazardous carbon containing compounds in water. Hence, there is still a need for a method and apparatus for altering a carbon containing compound in an aqueous mixture.

SUMMARY OF THE INVENTION

The present invention is a method and apparatus for altering a carbon containing compound in an aqueous mixture. According to a first aspect of the present invention, it has been discovered that for an aqueous mixture having a carbon containing compound with an ozone reaction rate less than the ozone reaction rate of pentachlorophenol, use of corona discharge in a low or non-oxidizing atmosphere increases the rate of destruction of the carbon containing compound compared to corona discharge in an oxidizing atmosphere. For an aqueous mixture containing pentachlorphenol, there was essentially no difference in destruction between atmospheres. According to a second aspect of the present invention, it has been further discovered that an aqueous mixture having a carbon containing compound in the presence of a catalyst and oxygen resulted in an increased destruction rate of the carbon containing compound compared to no catalyst.

It is hypothesized that when corona discharge dissociates solvent molecules in a water system it can form free radicals, ●H, and ●OH. The ●OH, hydroxyl, radical is an extremely aggressive oxidizer (oxidation potential 2.80 Volts) and the primary species considered active in advanced oxidation technologies such as UV/O3 and UV/peroxide (and Fenton's reagent, Fe/peroxide). The energy requirement for PCP destruction by corona discharge was compared with that of UV/O3 process (electricity to power the lamps and generate O3) and was found to substantially match. Further experiments also investigated the destruction of perchloroethylene and carbon tetrachloride with corona discharge. Each was destroyed in laboratory tests to 99+%. These carbon containing compounds are not considered oxidizable (Peroxpure, a UV/peroxide process cannot successfully treat these carbon containing compounds). Although, the mechanism has not been elaborated, another reaction pathway, besides oxidation by ●OH, is believed to play a critical part.

It is an object of the present invention to provide a method and apparatus for destroying a carbon containing compound in an aqueous mixture with corona discharge.

It is a further object of the present invention to provide a method and apparatus for destroying a carbon containing compound that has an ozone reaction rate less than or equal to pentachlorophenol in a low or non-oxidizing atmosphere.

It is a further object of the present invention to provide a method and apparatus for destroying a carbon containing compound that has an ozone reaction rate greater than or equal to pentachlorophenol in the presence of a catalyst and oxygen.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

A first aspect of the present invention is a method for altering a carbon containing compound in a aqueous mixture, the carbon containing compound having an ozone reaction rate less than or equal to the ozone reaction rate of pentachlorophenol, the method having the steps of:

(a) providing a vessel having an inlet for receiving the aqueous mixture;

(b) maintaining a low or non-oxidative atmosphere within the vessel;

(c) providing at least one first electrode positioned above a surface of the aqueous mixture and a second electrode in contact with the aqueous mixture; and (d) applying electric potential to the electrodes and creating a corona discharge from the at least one projecting electrode, thereby altering the carbon containing compound.

Carbon containing compounds that may be present in the aqueous mixture which are the target of the present invention are those compounds that are considered "unoxidizable" or difficult to oxidize. Non-oxidizable or difficult to oxidize compounds may be defined functionally as those compounds having a substantial portion pass through an oxidative process without modification. Oxidative processes include but are not limited to chemical oxidations using chemical oxidants, for example potassium dichromate and hydrogen peroxide, and/or using ozonation. One measure of oxidizability is an ozone reaction rate. Difficult to oxidize or non-oxidizable compounds have an ozone reaction rate less than or equal to the ozone reaction rate of pentachlorophenol and include but are not limited to pentachlorophenol (PCP), perchloroethylene (PCE), methylisobutylketone (MIBK) and carbon tetrachloride ($CCl_4$), chloroethylenes including specifically tetrachloroethylene and trichloroethylene, benzene, aliphatic alcohols, aldehydes, carbonic acids, specifically oxalic acid. There appears to be no limit to the concentration of the carbon containing compound from about detectable limits to a super-saturated solution or mixture that may be altered in accordance with the present invention. The rate of alteration of the carbon containing compound(s) is determined by the rate of electrical energy expended.

A low or non-oxidative atmosphere is an atmosphere that has a partial pressure of oxygen less than about 21 vol %, preferably less than about 10 vol %, more preferably less than about 5 vol % and most preferably less than about 1 vol %. A non-oxidative atmosphere specifically refers to an atmosphere of a non-oxidative gas, for example an inert gas or hydrogen. Inert gases include noble gases, for example argon and helium as well as nitrogen. Commercially available sources of inert gases generally have less than 1 vol % impurities.

The surface of the aqueous mixture may be planar or curved may be static or flowing, and may be oriented vertically, horizontally, or inclined.

For small units with one or several pointed or projecting electrodes, electrical parameters range from 1 to 20 kV and 35 $\mu$A to 500 $\mu$A. It is preferred that the projecting electrode(s) is negative and the second electrode positive. It has been found that this provides stable operation and requires less current than with the projecting electrode(s) positive. However, when the projecting electrode is positive, it can be more effective for carbon containing compound destruction, but it is less stable against arcing. The electricity may also be a.c., d.c., steady or pulsed.

Figure 1:
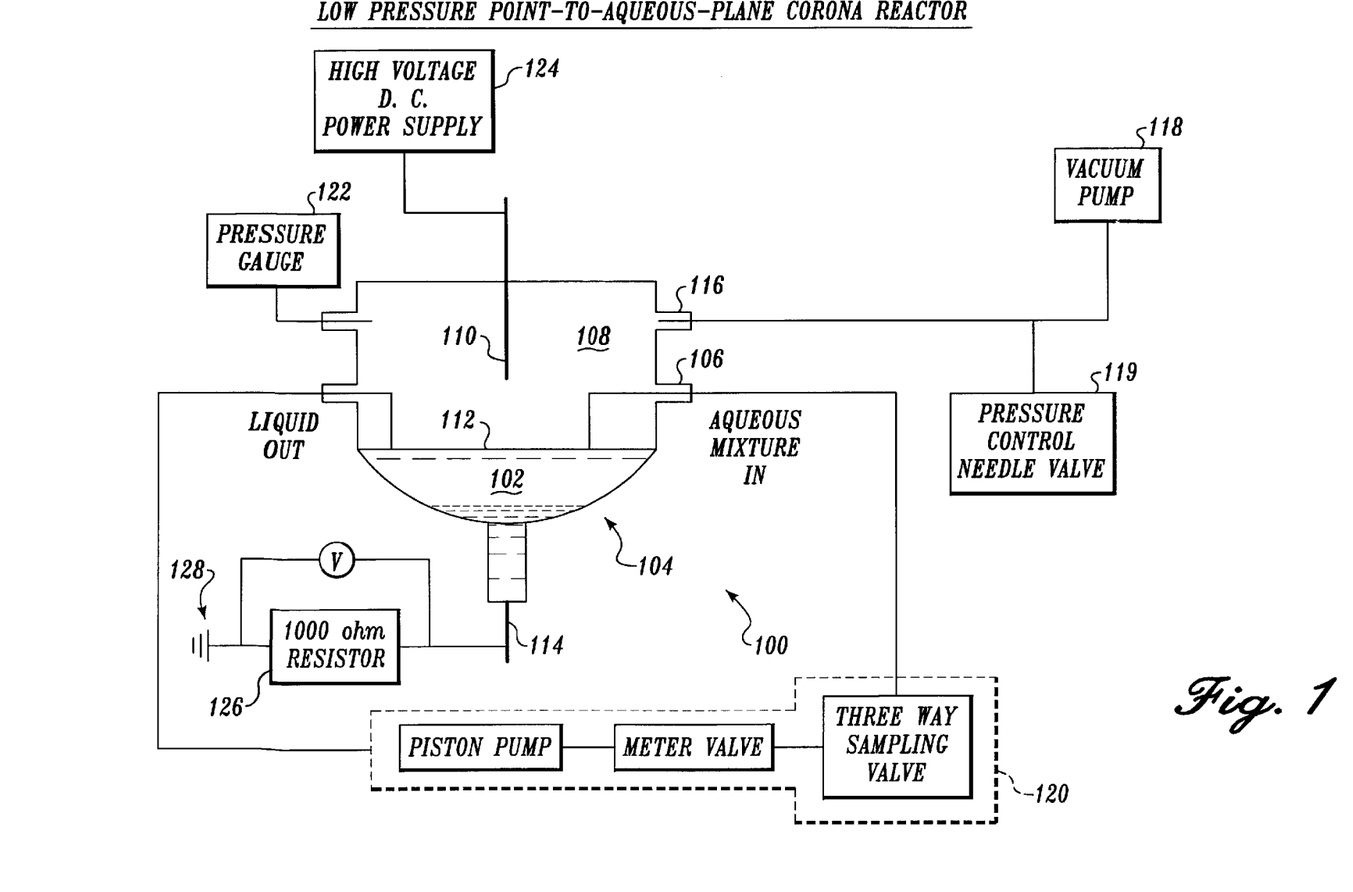
FIG. 1 is a combination cut-away and schematic of the apparatus of the present invention.

For scaled-up units, the electrical parameters may exceed 20 kV and 500 $\mu$A. The current density of the plasma is preferably from about 0.08 milliamp/cm2 to about 0.26 milliamp/cm2. Additional features are shown in FIG. 1 showing the apparatus 100 for altering a carbon containing compound in a aqueous mixture 102. The apparatus 100 has (a) a vessel 104 having an inlet 106 for receiving the aqueous mixture 102;

(b) a low or non-oxidative atmosphere 108 within the vessel 104;

(c) at least one first electrode 110 positioned above a surface 112 of the aqueous mixture 102 and a second electrode 114 in contact with the aqueous mixture 102; wherein (d) applying electric potential to the electrodes 110, 114 and creating a corona discharge from the at least one projecting electrode 110, alters the carbon containing compound.

The vessel 104 may further have an atmosphere port 116 for controlling the atmosphere 108.

A vacuum pump 118 and valve 119 may be used to control the pressure of the atmosphere 108. Alternatively a pressure source and pressure regulator (not shown) may be used. For measurement of carbon containing compound concentration, a recycle loop 120 may be used. A pressure gauge 122 may be used to monitor pressure of the atmosphere 108. Electricity is supplied through a high voltage power supply 124. The resistor 126 (optional) is a ballast resistor provided between the second electrode 114 and ground 128 for making measurements and for reducing the possibility of arcing from the projecting electrode. The distance between the first electrode 110 and the surface 112 is preferably less than 5 cm, and is preferably between about 0.5 and 2.0 cm.

Figure 1A:
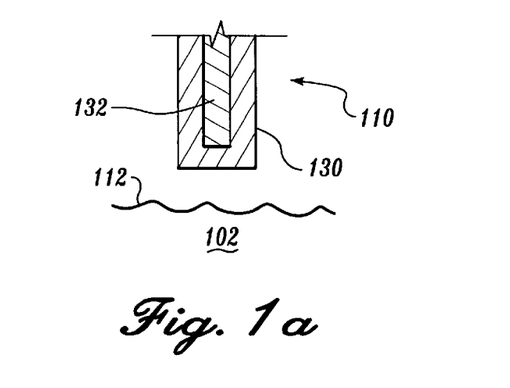
FIG. 1a is a cross section of a first electrode showing the conductive element encased with a dielectric material.

The first electrode may be one or several electrode elements. Each electrode element may have a geometric shape ranging from planar to pointed. For scaling up (FIGS. 1a–1d) for larger volumes mixtures having carbon containing compound, it is necessary to have more active electrode surface area. Increased electrode surface area may be achieved by increasing a number of pointed projections. However, it is preferred to place a dielectric material 130 between the conductive element 132 of the first electrode 110 and the surface 112 of the liquid 102 having the carbon containing compound as shown in FIG. 1a. The dielectric material 130 serves to distribute charge and avoid arcing. It is necessary that the dielectric material 130 completely encase the conductive element 132. Because of the high voltages used, any breach of the dielectric material 132 would permit a direct arc through the atmosphere to the liquid 102. Dielectric materials include but are not limited to quartz, glass metal oxides, polymers and combinations thereof. In order to provide sufficient electrical charge to the surface of the dielectric material, it is preferred that the conductive element of the first electrode 110 have substantial surface area contact to the dielectric material. This contact may be facilitated by the use of a condutive compound, for example epoxy resin with a conductive filler, or conductive ceramics. Conductive fillers include but are not limited to silver, carbon and combinations thereof. Because a dielectric material does not conduct current, but does transfer charge, use of alternating current or pulsed D.C. current facilitates sufficient charge transfer across the dielectric to support a plasma. Plasma strength is dependent upon the frequency of the alternating or pulsed current. It is possible to utilize frequencies of at least power grid frequencies (50–60 Hz), but preferred frequencies are greater than about 200 Hz, and more preferably from about 400 Hz to about 2,000 Hz or greater.

Figure 1B:
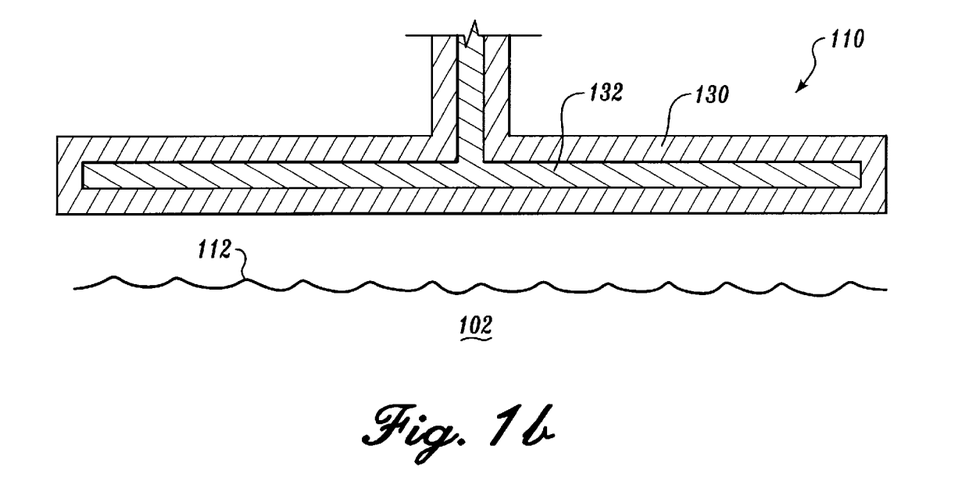
FIG. 1b is a cross section of a planar first electrode with a dielectric material.
Figure 1C:
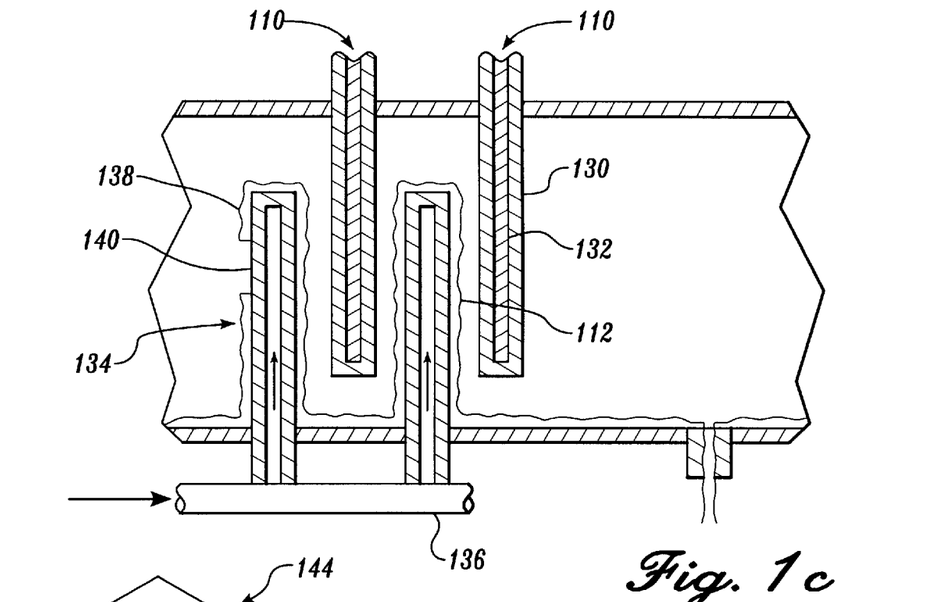
FIG. 1c is a cross section of an embodiment having a plurality of first electrodes and liquid supply ports.
Figure 1D:
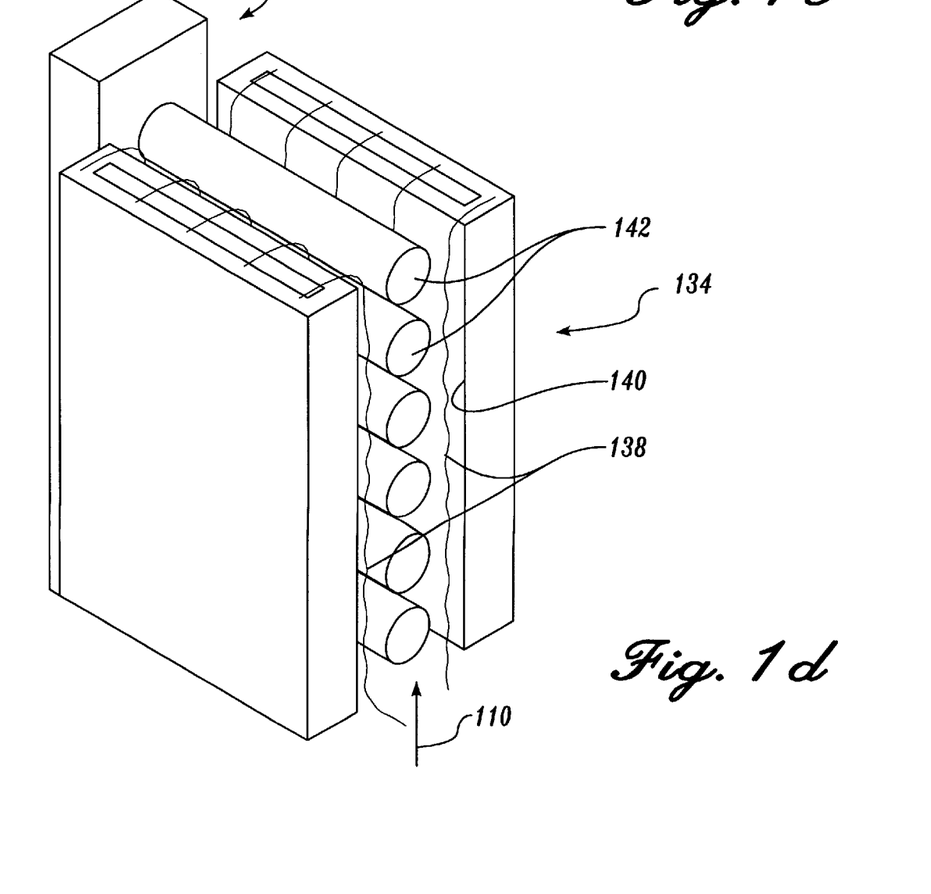
FIG. 1d is an isometric of a further embodiment wherein the first electrode has a plurality of projections.

Greater first electrode 110 surface area may be obtained as shown in FIG. 1b. In a further embodiment (FIG. 1c), the first electrodes 110 may be cylindrical or rectangular solid and suspended between liquid supply ports 134. The liquid 102 is supplied through a liquid supply header 136 to each liquid supply port 134 which overflows so that a liquid layer 138 forms on the exterior surface 140. The liquid layer surface 112 is exposed to the plasma field. A yet further embodiment is shown in FIG. 1d wherein the first electrode 110 has a plurality of projections 142 connected to a buss 144. The projections 142 are between liquid supply ports 134. It is necessary that there be a gap between the projections 142 and the liquid 102. The size of the gap is expected to vary according to construction and according to flow rate of the liquid 102, but is generally from about ½ cm to about 1 cm.

For generating a plasma, reducing the pressure in the space where the plasma is desired reduces the voltage requirement to initiate and sustain the plasma. Accordingly, it is preferred to use a space pressure less than 1 atmosphere. However, in order to gain a benefit of certain atmospheres, it is preferred that the reduced pressure be greater than the vapor pressure of the liquid at the operating temperature.

In a second aspect of the present invention, a method for oxidizing a carbon containing compound in an aqueous mixture, the carbon containing compound having an ozone reaction rate greater than or equal to the ozone reaction rate of pentachlorophenol has the steps of:

(a) providing a vessel having an inlet for receiving the aqueous mixture;

(b) providing a catalyst within the vessel, (c) providing an oxidative atmosphere within the vessel, (d) providing at least one projecting electrode positioned above a surface of the aqueous mixture and a second electrode in contact with the aqueous mixture; and (e) applying electric potential to the electrodes and creating a corona discharge from the at least one projecting electrode, thereby altering the carbon containing compound.

The oxidative atmosphere is one having a partial pressure of oxygen of from about 21% to about 100% of the total pressure of the oxidative atmosphere. Total pressure of the oxidative atmosphere is from about 50 Torr to about 1 atmosphere. The oxygen may be present with an inert gas, preferably nitrogen. Preferably the total pressure is low, less than one atmosphere.

Catalysts include but are not limited to $TiO_2$, $Fe_2O_3$, platinum on alumina and combinations thereof. The preferred catalyst is $TiO_2$.

Lab Equipment

The apparatus used in the examples 1–8 was shown in FIG. 1. The vessel 104 was a cylindrical Pyrex glass reactor 5 cm outer diameter and 16.5 cm outer height. The pump was a FMI Lab Pump (model RHV). Aliquots of 50 to 65 mL of aqueous mixture 102 were used. Carbon containing compounds were PCP, PCE, MIBK, and $CCl_4$. A magnetic stirrer (not shown) was used to stir the aqueous mixture. Stirring was gentle avoiding creation of a vortex.

Samples of PCE, MIBK, and $CCl_4$ were taken from the vessel 104 at regular intervals. About 1 mL of the aqueous sample was extracted with 5 mL of hexane and the resulting hexane layer was transferred to a GC vial. A dilution factor of 5 was included in the final concentration calculation determined by GC-MS.

Samples of PCP were taken at regular intervals and analyzed using high pressure liquid chromatography (HPLC).

EXAMPLE 1

An experiment was conducted to investigate the effect of atmosphere 108 on the destruction of the carbon containing compound, PCE, in the aqueous mixture 102. An empty Tedlar bag was filled with the gas to be used as the atmosphere 108 and attached to the vessel by drawing a vacuum with the vacuum pump 118. The vacuum pump 118 was isolated with the valve 119 then the gas permitted to enter the vessel 104 from the Tedlar bag. This was repeated three times. Pressure was again reduced and the aqueous mixture 102 drawn into the vessel 104. Electric current was 80 $\mu$A d.c.. Low pressure (158 Torr) permitted the plasma to be on the liquid surface. A water aspirator was used to pull vacuum, in order to avoid fire hazards.

Figure 2:
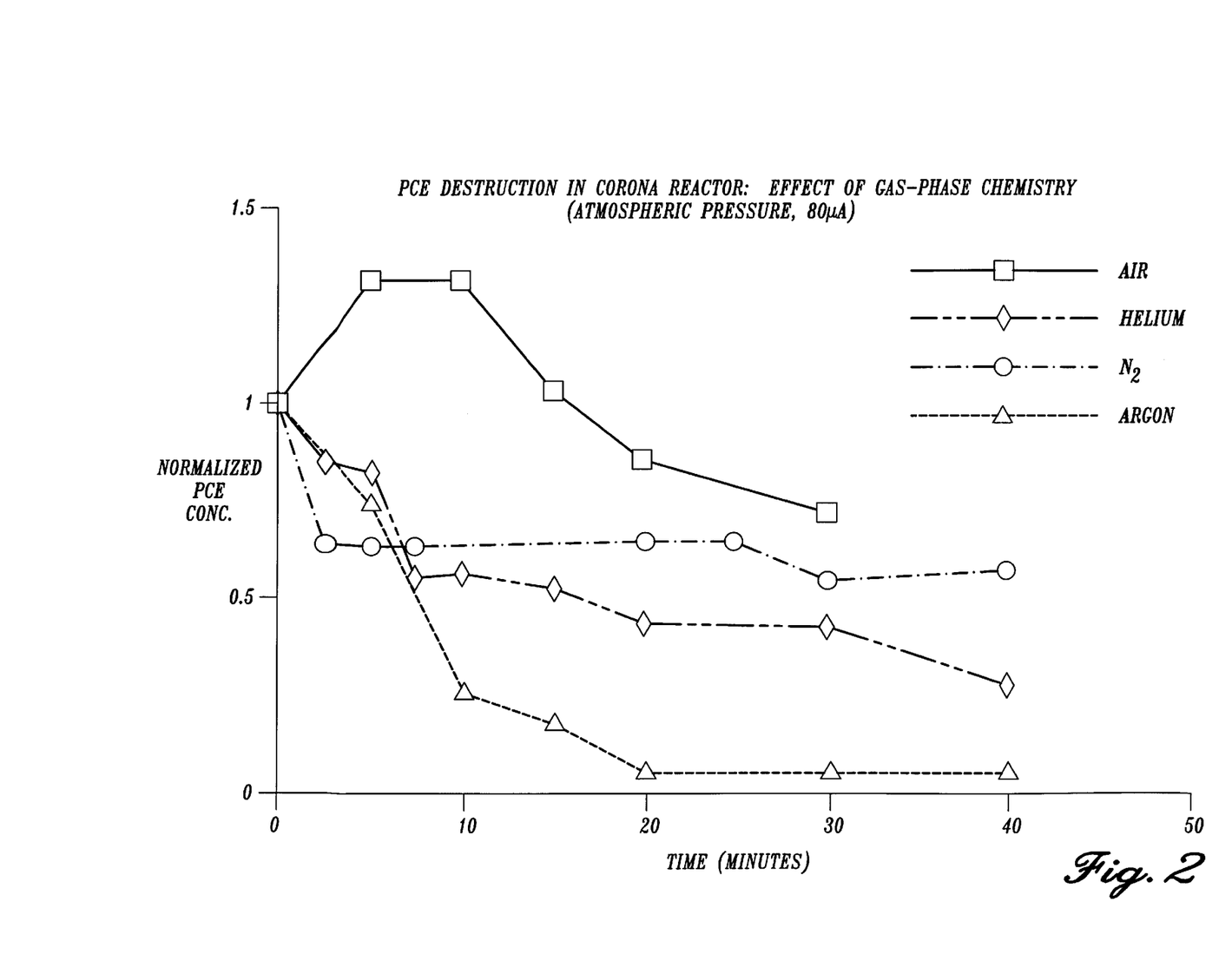
FIG. 2 is a graph of normalized PCE concentration versus time for various atmospheres.
Figure 3:
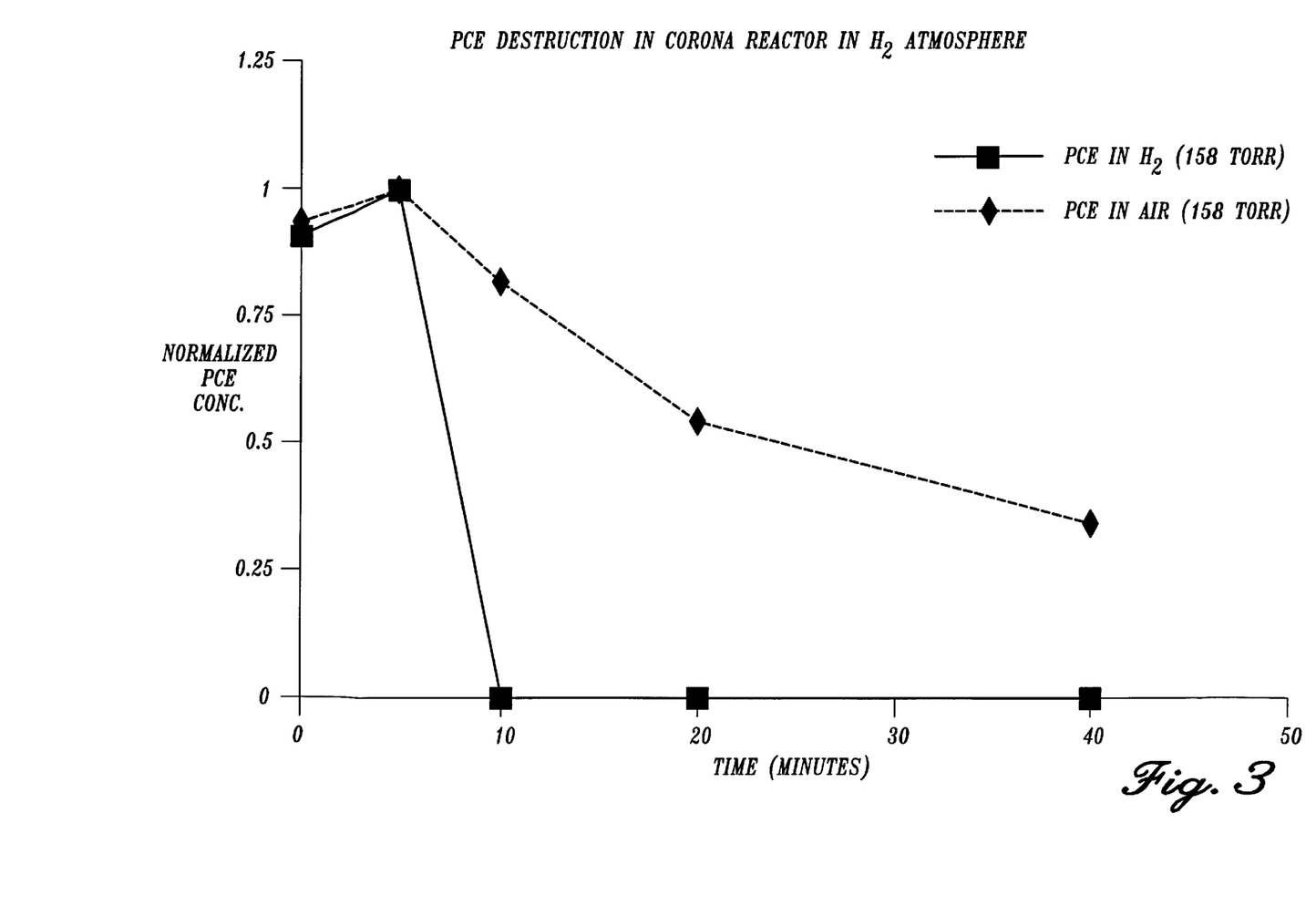
FIG. 3 is a graph of normalized PCE concentration versus time for reduced pressure air and hydrogen atmospheres.

Results are shown in FIGS. 2, 3. Use of air, helium, nitrogen or argon at one atmosphere pressure unexpectedly resulted in faster reaction rates for helium, nitrogen or argon, than for air as shown in FIG. 2. In FIG. 3, reduced oxygen pressure resulted in a faster rate and more complete destruction (PCE was removed to below detection limits) compared with the air in FIG. 2. Additionally, a reduced pressure atmosphere of hydrogen unexpectedly provided the fastest destruction rate for PCE.

EXAMPLE 2

Another experiment was conducted to investigate whether additional carbon containing compounds behaved similarly to PCE. The apparatus and procedures were as previously described. The carbon containing compounds were PCE (400 $\mu$g/mL), MIBK (246 $\mu$g/mL), and $CCl_4$ (200 $\mu$g/mL) subjected to atmospheres of air and argon. Electricity was 80 $\mu$A current d.c.. The headspace air of the vessel was replaced by argon by using the Tedlar bag technique previously described.

Figure 4:
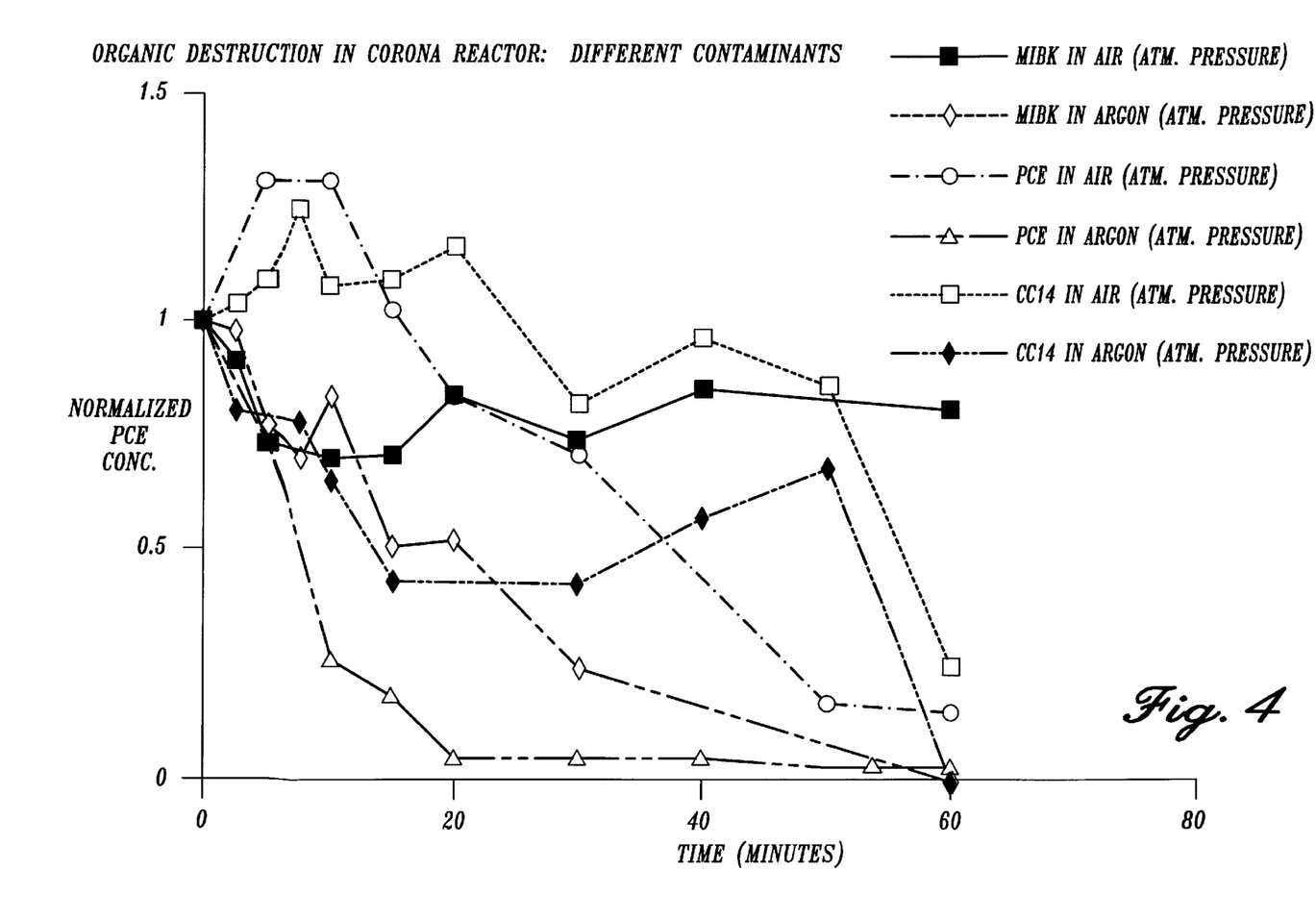
FIG. 4 is a graph of normalized contaminant concentration versus time for various contaminants for atmospheres of air and argon.

Results are shown in FIG. 4. For all three carbon containing compounds, use of a non-oxidative atmosphere (argon) unexpectedly resulted in faster carbon containing compound destruction than use of an oxidative atmosphere (air).

EXAMPLE 3

Another experiment was conducted to investigate a combination of non-oxidative gases in a non-oxidative atmosphere. In this experiment, the non-oxidative atmosphere was 4 vol % $H_2$ and 96 vol % Ar. The carbon containing compound was PCE.

Figure 5:
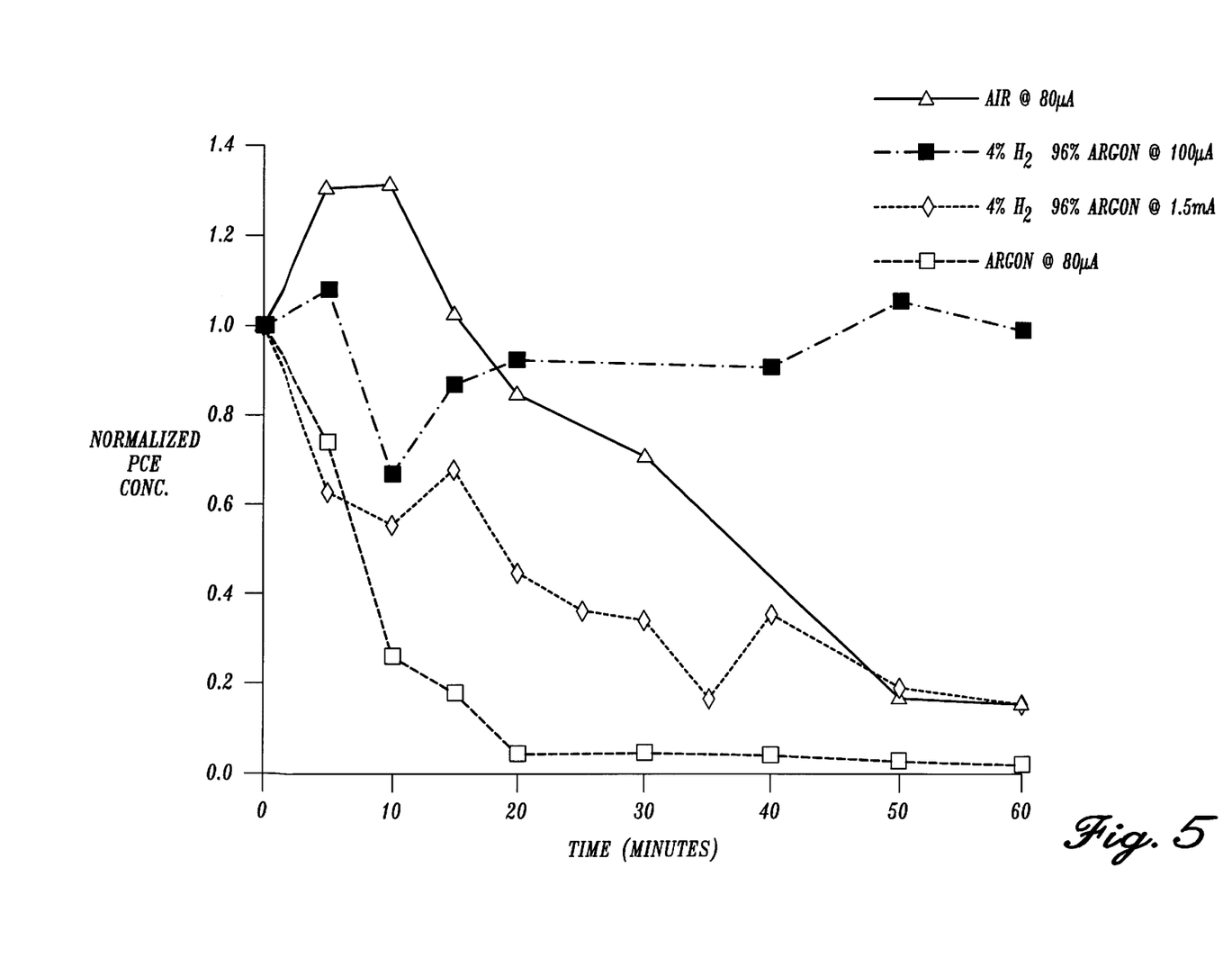
FIG. 5 is a graph of normalized PCE concentration versus time for atmospheres of air, argon, and argon with hydrogen.

Results are shown in FIG. 5. The addition of the hydrogen resulted in requiring a substantial increase in current to 1.5 mA to achieve a destruction rate comparable to an air atmosphere. With less current, the destruction rate was slower than in an air atmosphere.

EXAMPLE 4

A further experiment was conducted to investigate whether a catalyst in combination with either a non-oxidative or oxidative atmosphere. The catalyst selected was $TiO_2$ (9.6 $\mu$g/mL) and the atmospheres were argon and air at a pressure of 1 atmosphere. The carbon containing compound was PCE (400 $\mu$g/mL). Electricity was 80 $\mu$A current d.c.

Figure 6:
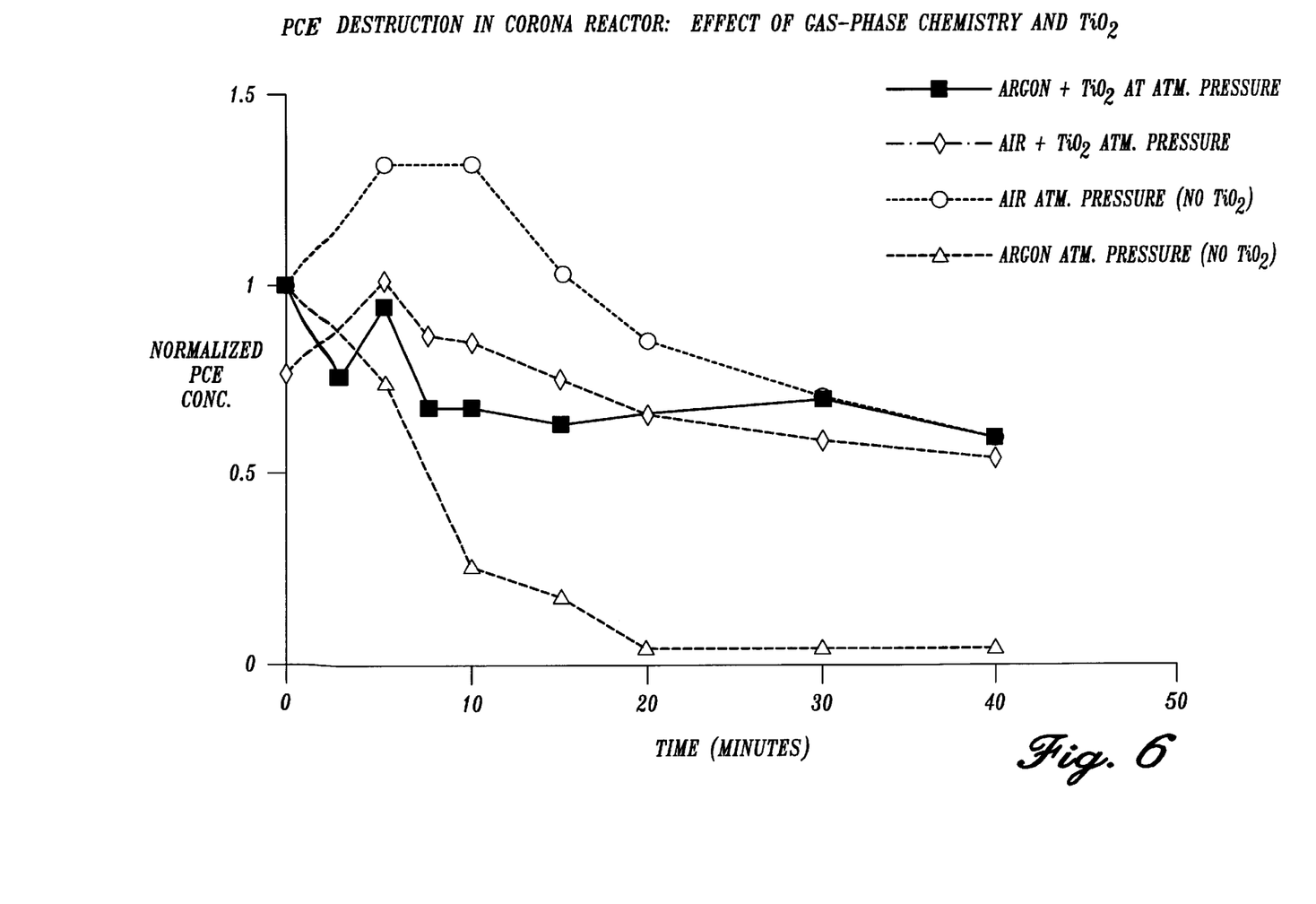
FIG. 6 is a graph of normalized PCE concentration versus time for argon and air atmospheres with and without titania catalyst.

Results are shown in FIG. 6. Use of the catalyst resulted in carbon containing compound destruction at rates faster than destruction in an air atmosphere without the catalyst. However, the use of no catalyst with an argon atmosphere resulted in a faster destruction rate than with use of the catalyst.

EXAMPLE 5

An experiment was conducted to investigate destruction of PCP in a non-oxidative atmosphere. No improvement was observed compared to destruction of PCP in air.

EXAMPLE 6

A further experiment was conducted to investigate destruction of PCP (35–45 $\mu$g/mL) in oxidative environments with and without catalyst. The oxidative environment was air at a pressure of 50 Torr and the catalysts were (1) no catalyst (control), $Fe_2O_3$ (15.3 μg/mL and 306.7 μg/mL), and platinum on alumina (33.3 μg/mL, loading unknown). Electric current was 100 μA d.c.

Figure 7:
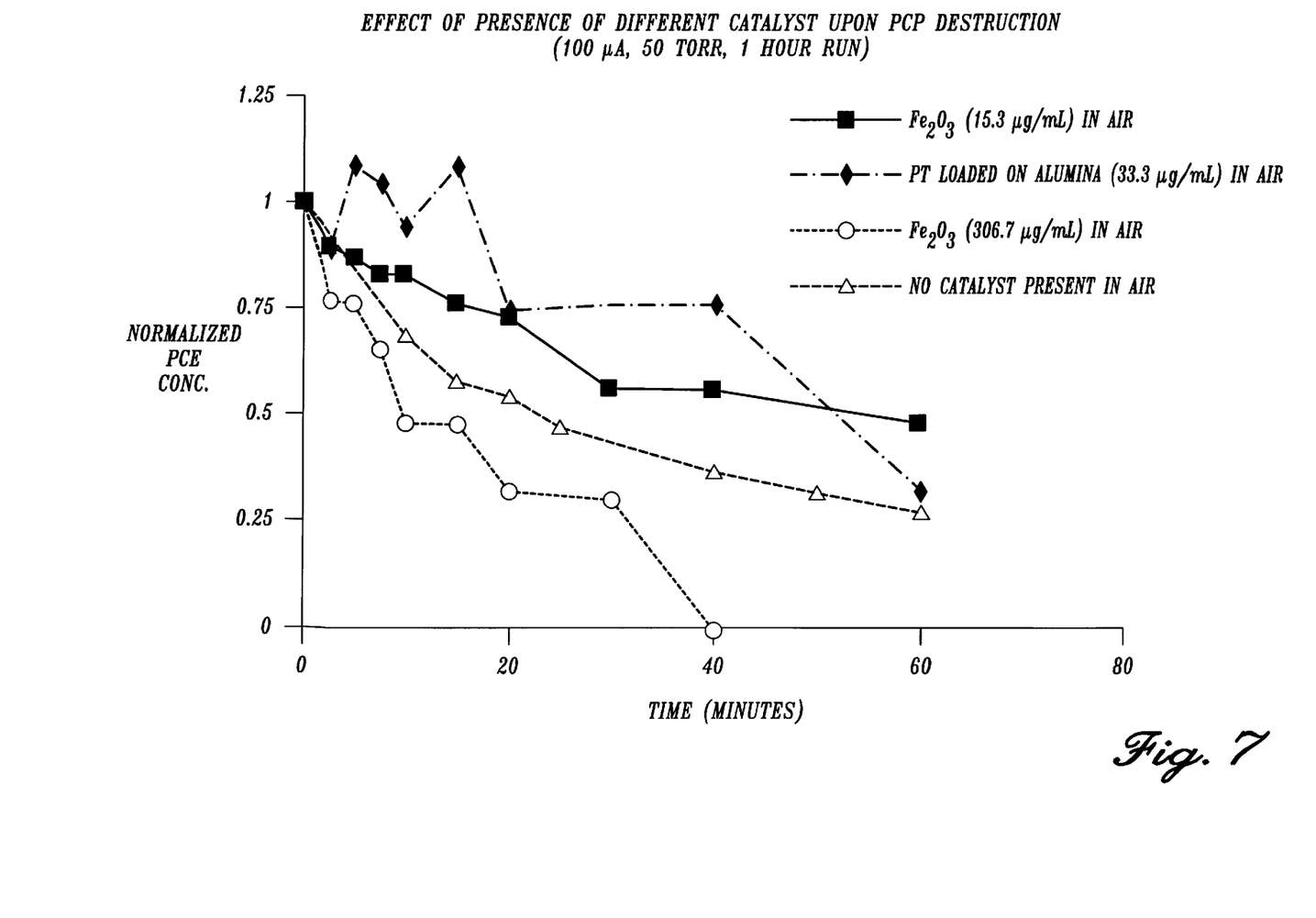
FIG. 7 is a graph of normalized PCP concentration versus time for various catalysts.

Results are shown in FIG. 7. Use of platinum on alumina or 15.3 μg/mL $Fe_2O_3$ gave slower destruction rates than with no catalyst. However, increasing the concentration of $Fe_2O_3$ to 306.7 μg/mL gave faster destruction rates for PCP.

It was hypothesized that increased destruction rates were due to the photochemical activity of $TiO_2$, upon $H_2O_2$, formed in-situ in the vessel. It was expected that, since $Fe_2O_3$ and $H_2O_2$ are the key ingredients of Fenton's reagent, the destruction rate might be improved by the formation of hydroxyl radicals using Fenton's reagent. However, no such effects were observed.

EXAMPLE 7

A further experiment was conducted to investigate the effect of increased oxygen concentration on destruction rate of PCP. Except where noted, conditions are the same as for Example 6. The atmospheres were air or oxygen at a pressure of 50 Torr. PCP was present in the aqueous mixture in an amount of 33 ppm. Catalysts used were no catalyst and $TiO_2$ (8.4 μg/mL). This experiment was conducted at 100 μA current.

Figure 8:
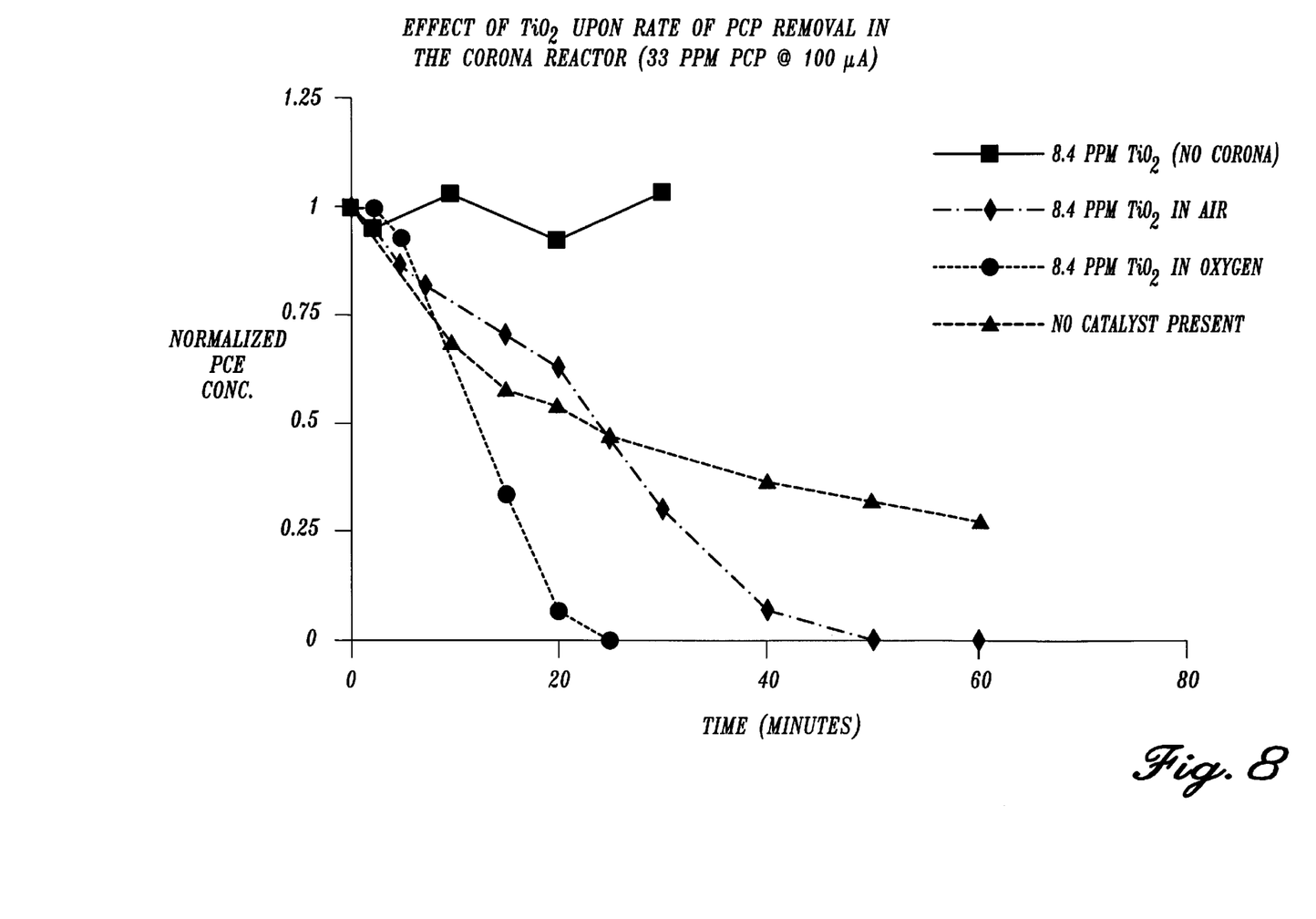
FIG. 8 is a graph of normalized PCP concentration versus time for various levels of oxygen.

Results are shown in FIG. 8. Without a corona discharge, the presence of a catalyst provided no destruction. With corona discharge, and $TiO_2$ catalyst, the destruction rates increased with increasing oxygen from air to about 100% oxygen.

EXAMPLE 8

An experiment was conducted to investigate the effect of concentration of a carbon containing compound having an ozone reaction rate less than the ozone reaction rate of PCP. The carbon containing compound was MIBK in a concentration of 3500 ppm in water (50 ml aliquot). Atmospheres were alternatively air and argon at atmospheric pressure. Electric current was 80 μA.

Figure 9:
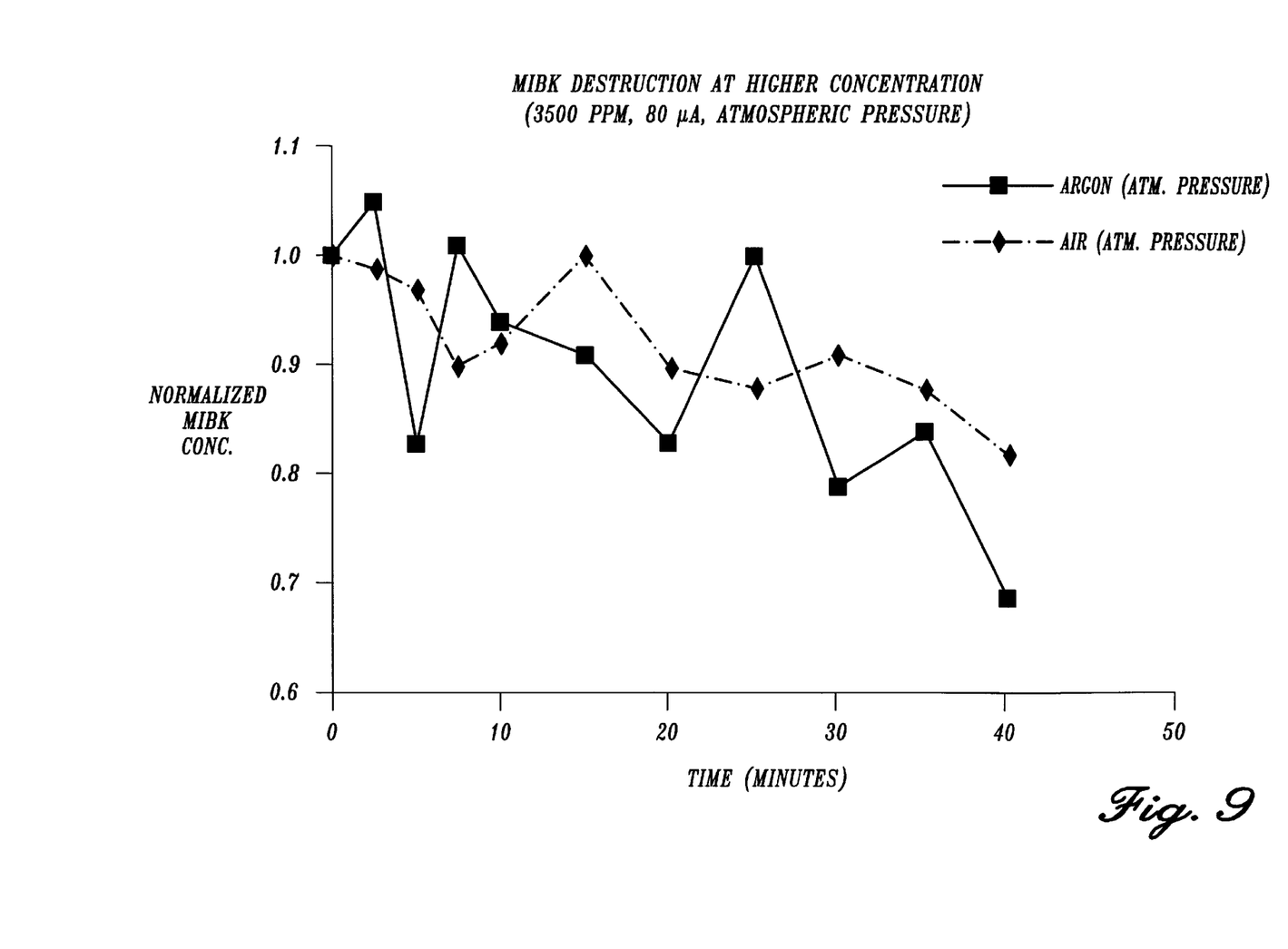
FIG. 9 is a graph of normalized MIBK concentration versus time for high concentration MIBK.

Results are shown in FIG. 9. The destruction rate of high concentration MIBK in air and in argon was about the same within experimental tolerance.

EXAMPLE 9

An experiment was conducted to demonstrate the increased throughput with a scaled-up embodiment. The embodiment of FIG. 1d was used. The electrode projections had a conductive element of stainless steel ⅜ inch diameter and 4-⅝ inch length, a conductive compound of silver filled epoxy resin purchased from AI Technology, Inc. Lawrenceville, N.J., model #EG8020, filled an annular space between the electrode and a dielectric material of a quartz glass tube. The quartz glass tube was hemispherical on its end with a 13 mm O.D. and a thickness of 1 mm. The liquid was water with PCP. Pressure was 40–50 mmHg absolute.

For maximum performance, it is believed that maximum liquid surface area exposed to plasma is needed. It was decided that the use of surfactants may interfere with the plasma destruction of the target compound and was therefore not used. Instead, the exterior surface 140 was bead blasted then coated with a hydrophilic coating to encourage wetting. The hydrophilic coating was titanium dioxide. In operation, liquid flow initially streamed and did not appear to wet the surface. After application of the plasma for about a minute, the liquid wet the surface and presented the desired surface area to the plasma.

During the first run, liquid was provided on both sides of the electrodes. Liquid samples of 50.63 ppm initial concentration of PCP were passed through the plasma at three different flow rates. Results are shown in Table E9-1. Voltage was between 3.1 to 3.2 kV and current was between 5.0–5.2 milliamp at a frequency from about 466–467 Hz.

TABLE E9-1

First Run Results

| Flow Rate (cc/min) | PCP output (ppm) | PCP Destruction (%) |
|---|---|---|
| 2 × 60.9 | 20.13 | 60 |
| 2 × 34.8 | 18.70 | 63 |
| 2 × 17.4 | 13.85 | 73 |

The three effluents from the first run were collected and mixed together to form a liquid containing PCP at an initial concentration of 18.24 ppm for a second run. The liquid flow was reduced by half by flowing liquid only on one side of the electrodes. Voltage was between 3.7–3.8 kV and current was between 2.59–2.64 milliamps at a frequency of about 466–467 Hz. Results are shown in Table E9-2.

TABLE E9-2

Second Run Results

| Flow Rate (cc/min) | PCP output (ppm) | PCP Destruction (%) | Overall PCP Destruction (First and Second Run) (%) |
|---|---|---|---|
| 60.9 | 3.95 | 78 | 91 |
| 34.8 | 2.95 | 84 | 94 |
| 17.4 | 1.55 | 92 | 97 |

EXAMPLE 10

Additional experiments using the equipment of Example 9 and 1 liquid flow were performed for parametric analysis. Specifically, current was increased (7.7–7.8 milliamps compared to 2.6 milliamps) with the same frequency (466–467 Hz) and frequency was increased (1000–1500 Hz). The initial PCP concentration was 35.28 ppm. Although improved PCP destruction was observed, the specific cost of electricity (cost per unit mass) was not available for full comparison. Results are shown in Tables E10-1 and E10-2.

TABLE E10-1

PCP Destruction with Increased Current (7.7–7.8 amp)

| Flow Rate (cc/min) | PCP output (ppm) | PCP Destruction (%) |
|---|---|---|
| 34.8 | 3.98 | 89 |
| 34.8 | 3.23 | 91 |

TABLE E10-2

PCP Destruction with increased Frequency

| Flow Rate (cc/min) | Frequency (Hz)/ Current (mA) | PCP output (ppm) | PCP Destruction (%) |
|---|---|---|---|
| 34.8 | 1000/5.5 | 1.79 | 95 |
| 34.8 | 1000/5.5 | 2.43 | 93 |
| 34.8 | 1500/8.1 | 2.56 | 93 |
| 34.8 | 1500/8.3 | 2.69 | 92 |

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for altering a carbon containing compound in an aqueous mixture, said carbon containing compound having an ozone reaction rate less than or equal to the ozone reaction rate of pentachlorophenol, said method comprising the steps of:

(a) providing a vessel having an inlet for receiving said aqueous mixture;

(b) maintaining a non-oxidative atmosphere having less than about 5 vol % oxygen within said vessel;

(c) providing at least one projecting electrode positioned above a surface of the aqueous mixture and a second electrode in contact with the aqueous mixture; and (d) applying electric potential to said electrodes and creating a corona discharge from said at least one projecting electrode, and altering said carbon containing compound; wherein the improvement comprises:

(e) said non-oxidative atmosphere is at a pressure less than one atmosphere.

2. The method as recited in claim 1, wherein said carbon containing compound is selected from the group consisting of pentachlorophenol, perchloroethylene, methylisobutylketone, $CCl_4$ and combinations thereof.

3. The method as recited in claim 1, wherein said non-oxidative atmosphere is selected from the group consisting of inert gas and hydrogen.

4. The method as recited in claim 3, wherein said inert gas is selected from the group consisting of noble gas and nitrogen.

5. The method as recited in claim 4, wherein said noble gas is argon.

6. The method as recited in claim 1, wherein a gap between said first electrode and said surface is from about 0.5 cm to about 5 cm.

7. The method as recited in claim 1, wherein said electric potential is from about 1 kV to about 20 kV.

8. The method as recited in claim 1, further comprising adding a catalyst into the vessel.

9. The method as recited in claim 8, wherein said catalyst is $TiO_2$.

* * * * *

UNITED STATES PATENT AND TRADEMARK OFFICE
CERTIFICATE OF CORRECTION

PATENT NO. : 5,980,701
DATED : November 9, 1999
INVENTOR(S) : Sharma et al.

It is certified that error appears in the above-identified patent and that said Letters Patent is hereby corrected as shown below:

Column 11,
Lines 22-24, please remove the section of text "said carbon containing compound having an ozone reaction rate less than or equal to the ozone reaction rate of pentachlorophenol, said method"
Lines 28 and 29, please replace "a non-oxidative...vol % oxygen" with -- an atmosphere --.

Column 12,
Lines 5-6, please remove section (e) of text.

Signed and Sealed this

Twelfth Day of November, 2002

Attest:

Attesting Officer

JAMES E. ROGAN
Director of the United States Patent and Trademark Office